United States Patent [19]

Kato et al.

[11] 4,455,085
[45] Jun. 19, 1984

[54] METHOD AND APPARATUS FOR DETECTING A FOCUSSING CONDITION OF AN OBJECTIVE LENS

[75] Inventors: Kiichi Kato; Kenichi Ito; Tohru Musha, all of Tokyo, Japan

[73] Assignee: Olympus Optical Co. Ltd., Japan

[21] Appl. No.: 292,930

[22] Filed: Aug. 14, 1981

[30] Foreign Application Priority Data

Aug. 19, 1980 [JP] Japan .................................. 55-114462

[51] Int. Cl.³ ............................................. G01J 1/36
[52] U.S. Cl. .................................... 356/122; 250/204; 369/45
[58] Field of Search ................... 356/122, 123; 369/45, 369/46, 112; 250/204

[56] References Cited

U.S. PATENT DOCUMENTS

| | | | |
|---|---|---|---|
| 4,010,317 | 3/1977 | Bouwhuis | 369/45 |
| 4,074,314 | 2/1978 | Velzel et al. | 369/46 |
| 4,205,338 | 5/1980 | Schaefer | 369/46 |
| 4,296,316 | 10/1981 | Tsuji et al. | 250/204 |
| 4,390,781 | 6/1983 | Musha | 250/204 |

*Primary Examiner*—R. A. Rosenberger
*Attorney, Agent, or Firm*—Parkhurst & Oliff

[57] ABSTRACT

A method and apparatus for detecting a focussing error signal of an objective lens with respect to a video disc on which a light beam emitted from a laser light source is to be focussed as a light spot by the objective lens. A light flux reflected by the video disc is made incident upon a detection prism surface which is set substantially at a critical angle with respect to a central light ray in the reflected light flux, and two light fluxes which situate on respective sides of a boundary plane including the central light ray and perpendicular to a plane of incidence, and are reflected by the reflection surface are separately received by two light receiving regions which are divided along a boundary plane including the central light ray reflected by the reflection surface and perpendicular to the plane of incidence. The focussing error signal is derived as a difference between output signals from the two light receiving regions. A relay lens is arranged between the reflection surface of the detection prism and the light receiving regions and the relay lens forms an image of a pupil of the objective lens on the light receiving regions.

36 Claims, 13 Drawing Figures

In-Focussed Condition

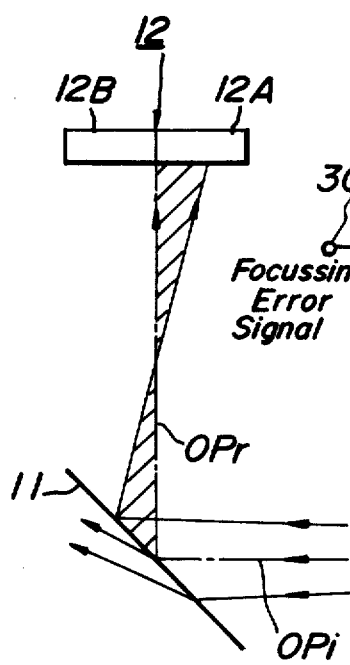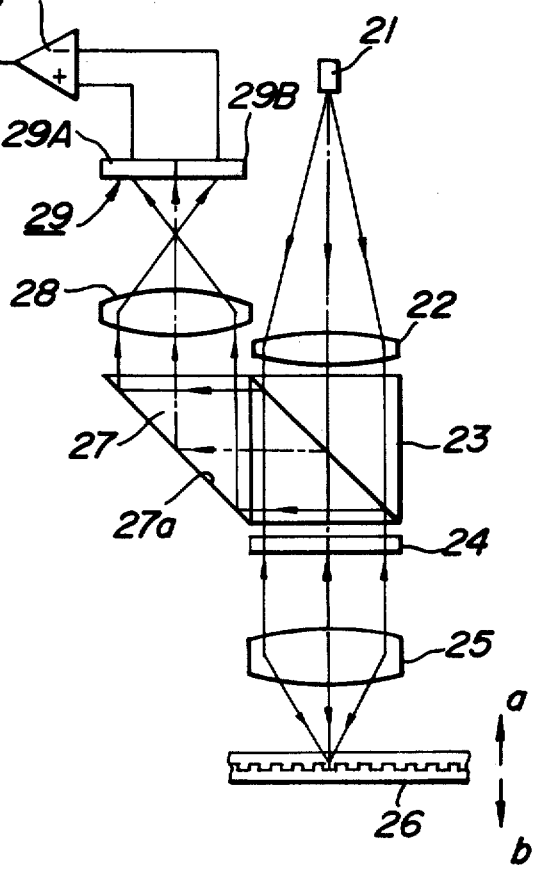

METHOD AND APPARATUS FOR DETECTING A FOCUSSING CONDITION OF AN OBJECTIVE LENS

BACKGROUND OF THE INVENTION

The present invention relates to a method for detecting a focussing condition of an objective lens with respect to an object on which a light spot has to be focussed by said objective lens and to an apparatus for carrying out such a focus detecting method.

Such focus detecting method and apparatus are advantageously applied to an apparatus in which a scanning light spot is projected by an objective lens onto one or more information tracks recorded spirally or concentrically on a disc-shaped record medium to read information recorded along the track.

In an embodiment of the apparatus for reproducing or picking-up an information from the above mentioned record medium, the record medium is known as a video disc in which encoded video and audio signals are recorded as optical information utilizing optical transmitting, reflection and phase properties. While the video disc is rotated at a high speed such as thirty revolutions per second, i.e. 1,800 rpm, a laser beam emitted from a laser light source such as a helium-neon gas laser is focussed on the track of the disc as a light spot and the optical information is read out therefrom. One of important properties of such a record medium is a very high density of recorded information and thus a width of the information track is very narrow and a space between successive tracks is also very narrow. In a typical video disc, a pitch of the tracks amounts only to 2 μm. Therefore, the diameter of light spot should be correspondingly small, such as 1 to 2 μm. In order to pick-up correctly the recorded information from such tracks having very narrow width and pitch, an error in the distance between the objective lens and the tracks, i.e. a focussing error, should be reduced to as little as possible to make a spot diameter as small as possible.

To this end, the apparatus is provided with a focussing control system in which an amount and a direction of a de-focussed condition of the objective lens with respect to the disc surface are detected to produce a focussing error signal and the objective lens is moved in a direction of the optical axis of objective lens in accordance with the detected focussing error signal.

FIG. 1 is a schematic view illustrating a known focus detection system in an optical pick-up apparatus. A light source 1 is constituted by a laser and emits light which is linearly polarized in a plane of the drawing of FIG. 1. The light is collimated by a collimator lens 2 into a parallel light beam which is then transmitted through a polarizing prism 3 and a quarter-wavelength plate 4. The light beam is further focussed by an objective lens 5 as a light spot on a disc 6 having one or more information tracks of crenellated pit construction. Then, the light is reflected by the information track and impinges upon the polarizing prism 3 by means of the objective lens 5 and the quarter-wavelength plate 4. The light impinging on the prism 3 is polarized in a direction perpendicular to the plane of the drawing, because it has transmitted through the quarter-wavelength plate 4 twice and thus, is now reflected by the polarizing prism 3. The light flux reflected by the polarizing prism 3 is converged by a condenser lens 7 and a cylindrical lens 8. Since the cylindrical lens 8 has a focussing power only in one direction, the shape of the focussed beam formed by the condenser lens 7 and the cylindrical lens 8 varies as shown in FIG. 1 with respect to an infocussed condition in mutually orthogonal directions, when the disc 6 moves up and down. In the known apparatus, this variation in shape is detected by a light detector (not shown) divided into four sections and arranged at a focal plane of the lens system 7, 8 to produce a focussing error signal. The focussing error signal thus detected is supplied to a focussing mechanism such as a moving coil mechanism to move the objective lens 5 in its axial direction.

In the known focus detecting system, since a relatively long optical path is required to focus the light beam after being reflected by the polarizing prism 3, there is a drawback that an optical system is liable to be large in size. Further, since the light detector having the four sections must be arranged precisely in three axial directions, i.e. in the optical axis direction and in two orthogonal directions perpendicular to the optical axis, the adjustment in positioning the light detector is quite critical and requires a time-consuming work. Moreover, since a dynamic range in which the accurate focussing error signal can be obtained due to the deformation of the focussed beam is relatively small, any focussing error signal could not be produced if the disc deviates from a given position only by a relatively small distance.

The applicant has proposed a method which can obviate the above mentioned drawbacks and can detect a focussing error signal of an objective lens with respect to an object onto which a light spot is to be focussed, which method has an extremely high sensitivity for focus detection.

According to this method, in order to detect a focussing error signal of an objective lens with respect to an object on which a light spot is to be formed by means of said object lens, the following steps are carried out; focussing light emitted from a light source onto the object; introducing at least a part of a light flux reflected from the object into an optical member including an optical surface which reflects and/or refracts said part of light flux, said optical member being made of material which has a higher refractive index than that of material into which said light flux enters after being refracted by and transmitted through said optical surface; and detecting a variation in distribution of light amount of at least a part of light flux reflected and/or refracted by said optical surface to produce the focussing error signal.

FIG. 2 is a schematic view illustrating an optical pick-up apparatus for effecting the above mentioned focus detection method proposed by the applicant. In this method, an optical system for projecting a scanning light spot onto a record medium is same as that shown in FIG. 1. A linearly polarized light beam emitted from a laser light source 1 is collimated into a parallel light beam by a collimator lens 2 and passes through a polarizing prism 3 and a quarter-wavelength plate 4. Then, the parallel light beam impinges upon an objective lens 5 and is focussed on an information track of a disc 6 as a small light spot. The light beam reflected by the disc 6 is optically modulated in accordance with information recorded in the track and is reflected by the polarizing prism 3. The construction and operation of the optical system so far explained are entirely same as those of the known optical system shown in FIG. 1. The light flux reflected by the polarization prism 3 impinges upon a detection prism 10 having a reflection surface 11 and the light flux reflected by this surface 11 is received by a light detector 12. The reflection surface 11 is so arranged with respect to the incident light that under an in-focussed condition it makes a given angle with respect to the incident light (parallel light flux) which angle is equal to a critical angle or slightly smaller or greater than the critical angle. Now, for the time being, it is assumed that the reflection surface 11 is set at the critical angle. In the in-focussed condition, the whole light flux reflected by the polarizing prism 3 is totally reflected by the reflection surface 11. In practice, a small amount of light is transmitted into a direction n shown in FIG. 2 due to incompleteness of a surface condition of the reflection surface 11. However, such a small amount of transmitted light may be ignored. If the disc 6 deviates from the in-focussed condition in a direction a in FIG. 2 and a distance between the objective lens 5 and the disc 6 is shortened, the light reflected by the polarizing prism 3 is no longer the parallel beam, but changes into a diverging light beam including extreme light rays $ai_1$ and $ai_2$. On the contrary, if the disc 6 deviates in the opposite direction b, the parallel light beam is changed into a converging light beam including extreme light rays $bi_1$ and $bi_2$. As can be seen in FIG. 2, light rays from an incident optical axis $OP_i$ to the extreme light ray $ai_1$ have incident angles smaller than the critical angle and thus, are transmitted through the reflection surface 11 at least partially. Contrary to this, light rays between the optical axis $OP_i$ and the extreme light ray $ai_2$ have incident angles larger than the critical angle and thus are totally reflected by the surface 11. In case of deviation of the disc 6 in the direction b, the above relation becomes inversed, and light rays below a plane which includes the incident optical axis $OP_i$ and is perpendicular to the plane of the drawing of FIG. 2, i.e. a plane of incidence, are totally reflected by the reflection surface 11, and light rays above said plane are at least partially transmitted through the reflection surface 11. As explained above, if the disc 6 deviates from the in-focussed position, the incident angles of the light rays impinging upon the reflection surface 11 vary in a continuous manner about the critical angle except for the center light ray passing along the optical axis $OP_i$. Therefore, when the disc 6 deviates from the in-focussed position either in the direction a or b, the intensity of the light reflected by the reflection surface 11 varies abruptly near the critical angle in accordance with the above mentioned variation in the incident angles. In this case, senses of the variations of the light intensities on both sides of said plane perpendicular to the incident plane and including the incident optical axis $OP_i$ vary in mutually opposite manner. On the contrary, in the in-focussed condition, the light flux impinging upon the detection prism 10 is totally reflected by the reflection surface 11 and thus, the uniform light flux impinges upon the light detector 12. The light detector 12 is so constructed that the lower and upper light fluxes with respect to said plane are separately received by separate regions 12A and 12B, respectively. That is to say, the light detector 12 is divided along a plane which is perpendicular to the incident plane and includes an optical axis $OP_r$ of reflected light.

In FIG. 2, if the disc 6 deviates in the direction a, the light rays of the lower half of the incident light flux have incident angles smaller than the critical angle. Therefore, at least a part of the lower half light flux is transmitted through the reflection surface 11 and the amount of light impinging upon the light receiving region 12A is decreased. While the upper half of the incident light flux has the incident angles larger than the critical angle and thus, is totally reflected by the surface 11. Therefore, the amount of light impinging upon the light receiving region 12B is not changed. On the contrary, if the disc 6 deviates in the direction b, the amount of light impinging upon the region 12B is decreased, but the amount of light impinging upon the region 12A is not changed. In this manner, the output signals from the regions 12A and 12B vary in an opposite manner. A focussing error signal can be obtained at an output 14 of a differential amplifier 13 as a difference signal of these signals from the regions 12A and 12B.

The reflection surface 11 may be set at an angle slightly smaller than the critical angle. In such a case when the disc 6 deviates in the direction a, the amount of light impinging upon the region 12B is first increased and then becomes constant and the amount of light impinging upon the region 12A is decreased abruptly. Whereas, if the disc 6 deviates in the direction b, the amount of light impinging upon the region 12A is first increased and then becomes constant, while the amount of light impinging upon the region 12B is decreased abruptly.

In this manner by detecting a difference in output signals from the light receiving regions 12A and 12B, it is possible to obtain the focussing error signal having an amplitude which is proportional to an amount of the deviation from the in-focussed condition and a polarity which represents a direction of the deviation with respect to the in-focussed condition. The focussing error signal thus obtained is used to effect a focussing control for driving the objective lens 5 in the direction of its optical axis. Further, it is possible to derive an information signal corresponding to the pit information recorded in the information track at an output 16 of an adder 15 which produces a sum signal of the output signals from the regions 12A and 12B. Further, in the in-focussed condition, since the light is scarcely transmitted through the reflection surface 11, a loss of light is very small and in the defocussed condition the half of light flux with respect to the central light ray is totally reflected, but an amount of the other half of light flux reflected by the surface 11 is decreased to a great extent, the difference in the amount of light impinging upon the regions 12A and 12B becomes great. Therefore, the very accurate focus detection can be effected with a very high sensitivity.

For instance, when use is made of the objective lens 5 having a numerical aperture $NA = 0.5$ and a focal length $f = 3$ mm and of the detection prism 10 having a refractive index $n = 1.50$ and the disc 6 deviates by about 1 μm, a variation of an incident angle for the extreme right ray which is subjected to the largest variation in incident angle is about 0.015° which can cause a sufficiently large variation in light amount impinging upon the detector regions 12A and 12B.

In the focussing error signal detecting apparatus shown in FIG. 2, if an optical length from the disc 6 to the detection prism 10 is made very long, when the disc 6 greatly deviates from the in-focussed condition, the converging light flux impinging upon the detection prism 10 becomes very close to the optical axis $OP_i$. In such a case, when the light flux is reflected by the reflecting surface 11 which is substantially set at the critical angle, the reflected light flux is made incident upon the detector 12 after passing across a boundary plane including the optical axis $OP_r$ and thus, the positional relation of the bright and dark areas on the detector will be inversed with respect to that explained above with reference to FIG. 2. This will be further explained in detail with the aid of FIG. 3. In FIG. 3, the disc 6 deviates in the direction a to a great extent and a diverging light flux is made incident upon the reflection surface 11 of detection prism 10. In this case, the light flux situating above the boundary plane which includes the optical axis $OP_i$ and which is perpendicular to the plane of the drawing, is made incident upon the surface 11 at angles larger than the critical angle and thus, is totally reflected by the surface 11. Contrary to this, the light flux situating below the boundary plane is made incident upon the surface 11 at angles smaller than the critical angle and thus, is transmitted through the surface and is refracted thereby. The light flux reflected by the surface 11 is made incident upon the detector 12 after passing across the optical axis $OP_r$. Therefore, the light receiving region 12A becomes bright, but the light receiving region 12B becomes dark. In the apparatus illustrated in FIG. 2, such a condition of bright and dark areas on the detector should be obtained when the disc 6 deviates not in the direction a, but in the direction b. Therefore, in such a case, the focussing control could not be effected in a correct manner. That is to say, when the disc 6 deviates largely in the direction a, there might be generated a focussing error signal by means of which the disc 6 is further driven in the direction a. As can be seen from FIG. 3, the above undesired phenomenon may be deleted to some extent by arranging the detector 12 closer to the objective lens 5. However, in practice, between the lens 5 and the detector 12 are inserted the light splitting element 3, the quarter-wavelength plate 4 and the detection prism 10. Therefore, it is practically difficult to arrange the detector 12 closer to the lens 5.

SUMMARY OF THE INVENTION

The present invention has for its object to provide a novel and useful method for detecting a focussing error signal which method can still attain the above mentioned advantages of the method utilizing the total reflection by means of the reflection surface set substantially at the critical angle and can obviate the above mentioned drawback due to the inversion of the positional relation of the bright and dark areas on the detector.

According to the invention, a method for detecting a focussing error signal of an objective lens with respect to an object on which a light spot is to be formed by means of said objective lens comprises focussing light emitted from a light source onto the object; introducing at least a part of a light flux reflected from the object into an optical member including an optical surface which reflects and/or refracts said part of light flux, said optical member being made of material which has a higher refractive index than that of material into which said light flux enters after being refracted by and transmitted through said optical surface; detecting by a light detector a variation in distribution of light amount of at least a part of light flux reflected and/or refracted by said optical surface to produce the focussing error signal; and guiding at least a part of the light flux reflected and/or refracted by said optical surface to a relay lens and then introducing the light flux transmitted from the relay lens onto the light detector.

It is still another object of the invention to provide an apparatus for detecting a focussing error signal, in which a light detector can be easily arranged in position without troublesome adjustment and alignment.

According to the invention, an apparatus for detecting a focussing error signal of an objective lens with respect to an object onto which a light beam emitted from a light source is to be focussed as a light spot by means of said objective lens comprises: a beam splitting element arranged between the light source and the objective lens for directing the light beam emitted from the light source to the object lens and directing a light flux reflected by the object into a direction different from that to the light source; an optical member arranged to receive at least a part of the light flux reflected from said object and including an optical surface which reflects and/or refracts said part of light flux, said optical member being made of material which has a higher refractive index than that of material into which the light flux enters after being refracted by and transmitted through said optical surface; a relay lens arranged to receive at least the part of the light flux reflected and/or refracted by said optical surface; light detecting means having at least two light receiving regions arranged to receive at least part of the light flux transmitted through said relay lens to produce output signals representing amounts of light impinging upon the light receiving regions; and a circuit for receiving the output signals from the light detecting means to form a difference signal as the focussing error signal.

BRIEF DESCRIPTION OF THE DRAWINGS

FIG. 3 is a sketch showing an operation of the apparatus shown in FIG. 2;

FIG. 4 is a schematic view illustrating an embodiment of the focussing error signal detecting apparatus according to the invention;

DESCRIPTION OF THE PREFERRED EMBODIMENTS

Figure 1:
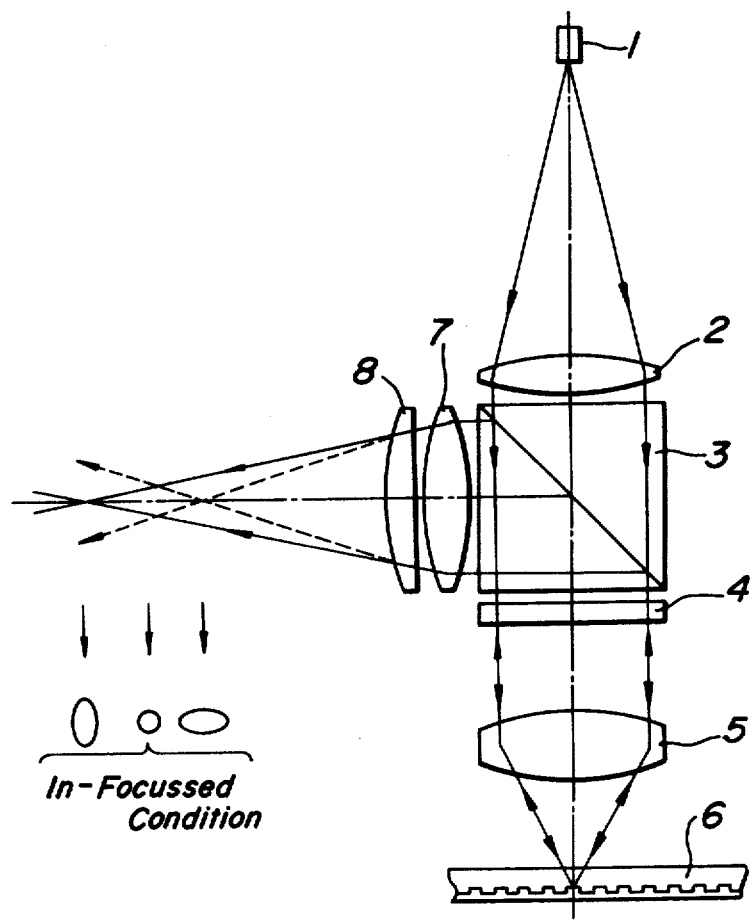
FIG. 1 is a schematic view illustrating an optical system of an optical pick-up apparatus with a known focus detection system.

FIG. 4 is a schematic view showing an embodiment of the focussing error signal detecting apparatus according to the invention. A polarized beam emitted from a light source 21 is converted by a collimator lens 22 into a parallel light beam which is made incident via a polarization prism 23, a quarter-wavelength plate 24 and an objective lens 25 upon a disc 26 as a small light spot. The light reflected by the disc 26 is collected by the objective lens 25 and is made incident upon a detection prism 27 by means of the quarter-wavelength plate 24 and the polarization prism 23. The above mentioned elements are so arranged that in case of in-focussed condition, a parallel light flux is made incident upon a reflection surface 27a of the detection prism 27. The reflection surface 27a is so arranged that the parallel light flux impinges upon the surface 27a substantially at a critical angle. The light reflected by the surface 27a is made incident upon a light detector 29 by means of a relay lens 28. The light detector 29 comprises first and second light receiving regions 29A and 29B which are connected to respective inputs of a differential amplifier 30 having an output 30a for generating a focussing error signal.

Figure 5A:
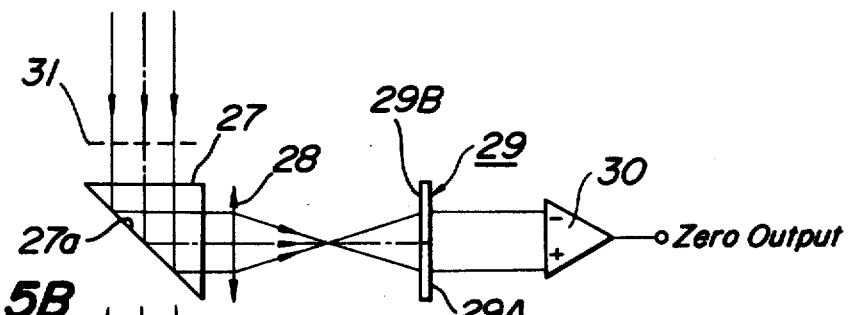
FIGS. 5A to 5D are schematic views for explaining an operation of the focus detection apparatus according to the invention.

Now, the operation of the apparatus will be explained with reference to FIGS. 5A to 5D. FIG. 5A shows the in-focussed condition and the light from the objective lens 25 is made incident upon the detection prism 27 as the parallel light flux. The parallel light flux reflected by the surface 27a is received by the relay lens 28 which forms an image of a position 31 on the detector 29. In the in-focussed condition, the light flux is totally reflected by the surface 27a and the light receiving regions 29A and 29B receive the light uniformly. Therefore, the differential amplifier 30 does produce the focussing error signal of zero amplitude. The focussing error signal of zero amplitude indicates that the disc 26 is in the in-focussed position with respect to the objective lens 25.

Figure 5B:
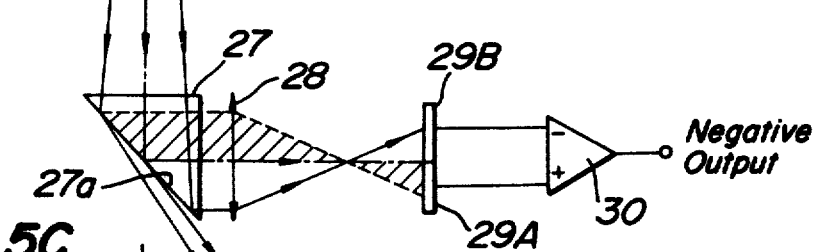
Figure 5C:
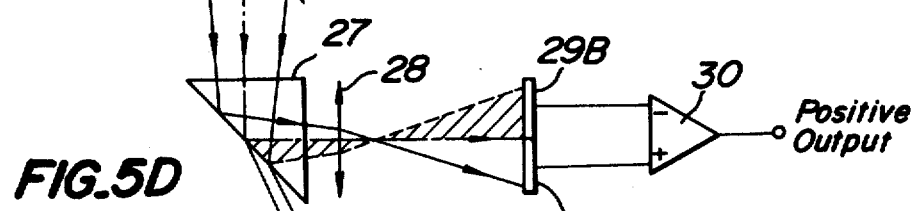
Figure 5D:
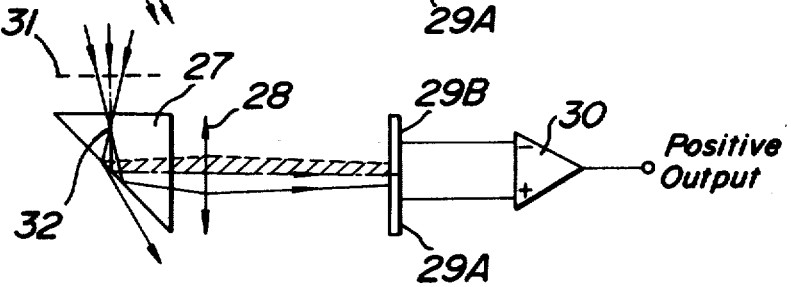

FIG. 5B illustrates a case in which the disc 26 deviates in the direction a. In this case a diverging light flux is made incident upon the reflection surface 27a and thus, a left hand half of the incident light flux is transmitted through the surface 27a of the prism 27, but a right hand half of the incident light flux is totally reflected by the surface 27a. This reflected light flux is made incident exclusively upon the second light receiving region 29B by means of the relay lens 28. Since the first light receiving region 29A does not receive the light, the differential amplifier 30 produces the focussing error signal of negative polarity. In FIGS. 5B to 5D, hatchings denote areas in which substantially no light flux exists due to the transmission of the light flux through the surface 27a.

FIG. 5C shows a case in which the disc 26 deviates in the direction b. In this case, the first light receiving region 29A exclusively receives the light flux reflected by the surface 27a and thus, the differential amplifier 30 produces the focussing error signal of positive polarity.

FIG. 5D illustrates a case in which the disc 26 deviates further in the direction b and situates far from the objective lens 25. In this case, the light flux projected from the relay lens 28 arrives at the detector 29 without being inversed up side down. Therefore, the light flux reflected by the surface 27a is selectively made incident upon the second light receiving region 29B of the detector 29. Therefore, the differential amplifier 30 still produces the focussing error signal of positive polarity. In this manner, according to the invention it is possible to obtain the focussing error signal having correct polarity even if the disc 26 deviates to a large extent. As apparent from FIG. 5D, the correct focussing error signal can be obtained as long as a focussing point 32 of the light flux from the objective lens 25 situates nearer to the objective lens with respect to the object plane 31 of the relay lens 28. In this manner according to the invention it is possible to obtain the focussing error signal of correct polarity over a wide deviation range of the disc 26.

Figure 2:
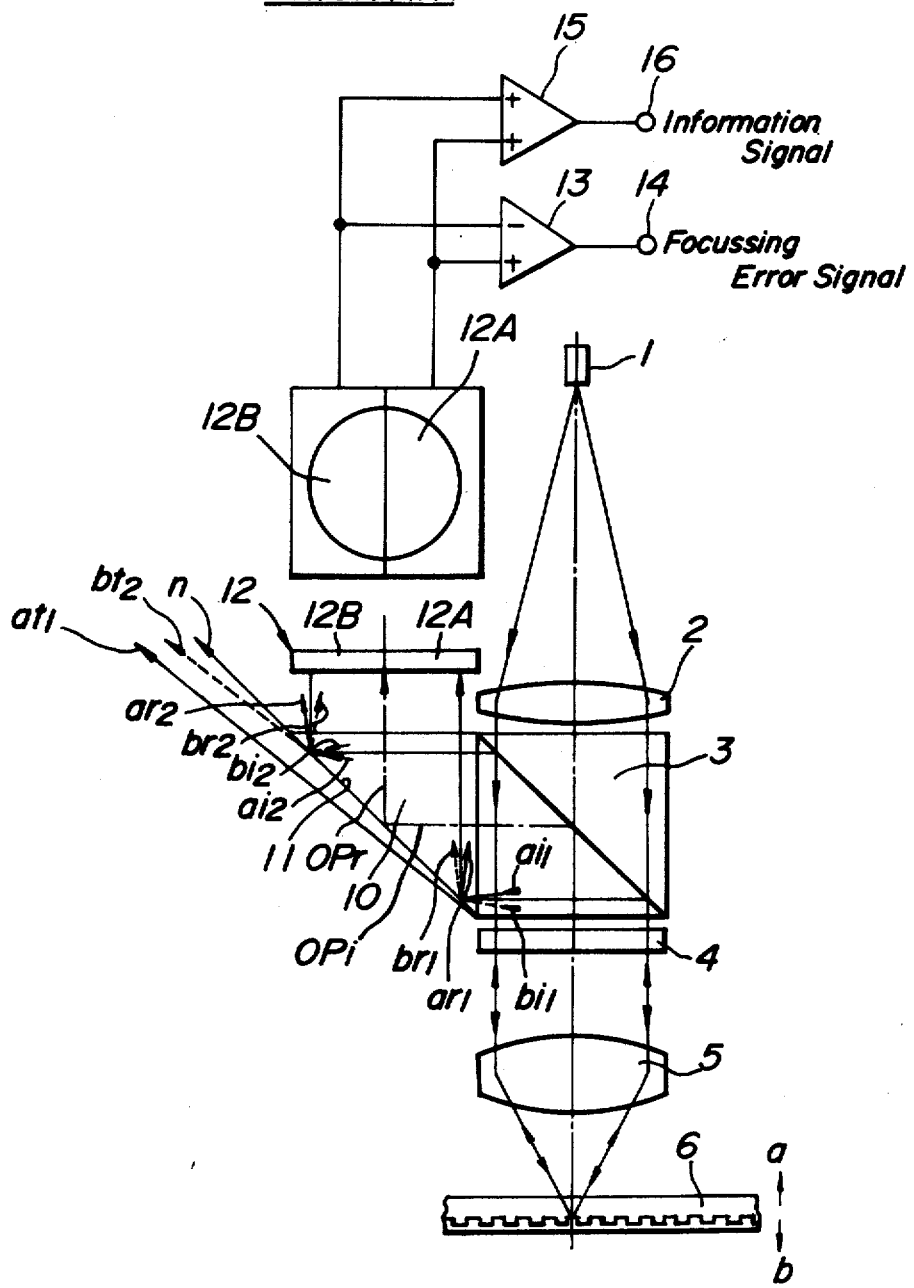
FIG. 2 is a schematic view showing an embodiment of a focus detection apparatus which has been proposed by the applicant.
Figure 6:
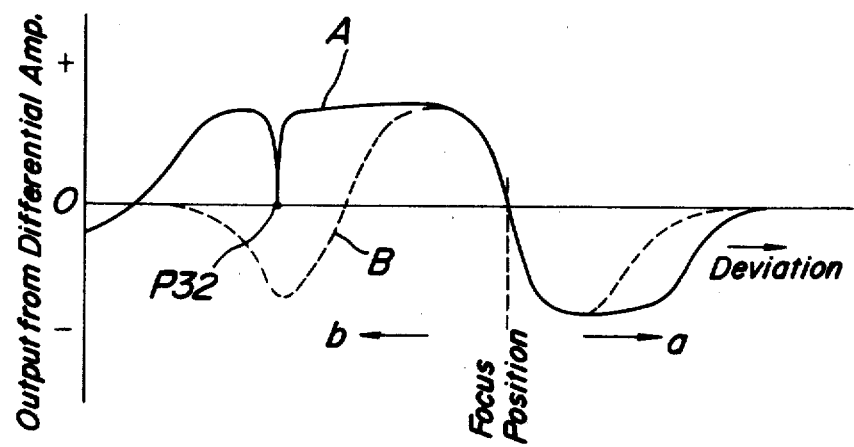
FIG. 6 is a graph showing the focussing error signal obtained by the apparatus shown in FIG. 4.

A solid curve A in FIG. 6 shows the focussing error signal produced from the differential amplifier 30 according to the invention. A dotted curve B represents the focussing error signal produced by the differential amplifier 13 of the apparatus shown in FIG. 2. It is apparent from the graph of FIG. 6, according to the invention the focussing error signal of correct polaritty can be obtained over the very wide range of the deviation of the disc. In the curve A, there is a singular point $P_{32}$ corresponding to a case in which the light flux from the objective lens 25 is focussed just on the reflection surface 27a of the detection prism 27. In such a case the light detector 29 is uniformly irradiated and thus, the differential amplifier 30 produces the zero output. However, such a situation occurs only when the reflection surface 27a is within a focal depth of the focussed light from the objective lens 25 and when the surface 27a is brought out of the focal depth to the slightest extent, the correct focussing error signal can be obtained. Therefore, in a practical apparatus, the above mentioned singular point $P_{32}$ does not cause any trouble and can be neglected.

Figure 7:
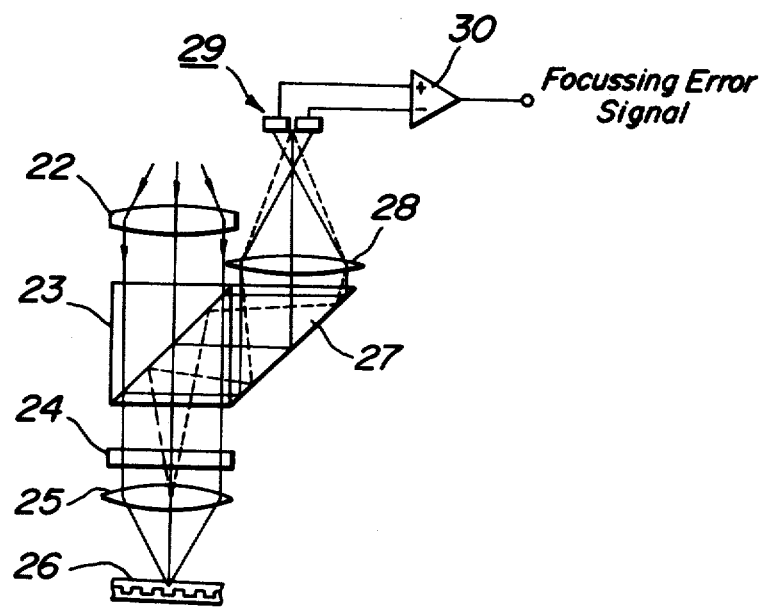
FIGS. 7, 8, 9 and 10 are schematic views showing several embodiments of the focussing error signal detecting apparatus according to the invention.

FIG. 7 is a schematic view illustrating another embodiment of the focussing error signal detection apparatus according to the invention. In the embodiment shown in FIG. 4, since the special point $P_{32}$ is defined by a distance from the objective lens 25 to the reflection surface 27a of the detection prism 27, it is possible to delete the influence of the singular point $P_{32}$ by arranging the elements in such a manner that the relay lens 28 forms an image of an object plane situating between the reflection surface 27a and a pupil of the objective lens 25 just on the light detector 29. In the embodiment shown in FIG. 7, the relay lens 28 forms the image of pupil of the objective lens 25 on the light detector 29.

Figure 8:
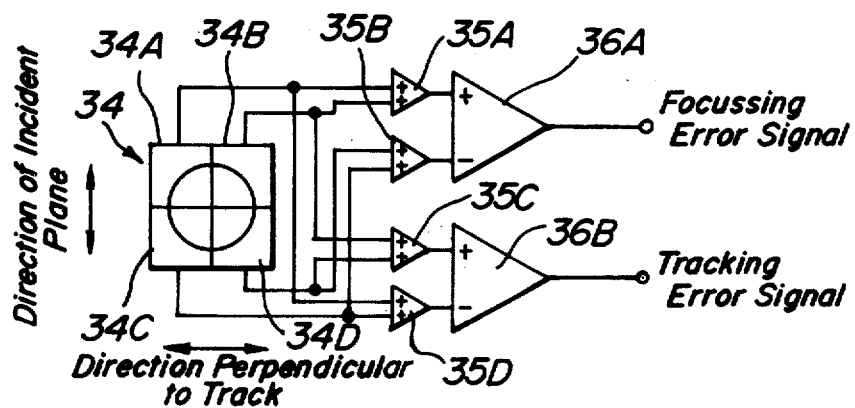

When use is made of the disc 26 of the phase construction type and having a pit depth other than a quarter-wavelength, a distribution of light intensity at the pupil of the objective lens 25 varies in an asymmetrical manner in accordance with a mutual position between the pits and the beam spot. Therefore, in the embodiment shown in FIG. 7 in which the image of the pupil of the objective lens 25 is formed by the relay lens 28 on the detector 29, it is possible to obtain a tracking error signal as well as the focussing error signal by using a light detector 34 having four light receiving regions 34A to 34D divided in the direction of the incident plane to the reflection surface 27a of the detection prism 27 as well as in the direction perpendicular to the track as shown in FIG. 8. A first sum of outputs from the first and second light receiving regions 34A and 34B is formed by a first adder 35A and a second sum of outputs from the third and fourth light receiving regions 34C and 34D is produced by a second adder 35B. The focussing error signal can be obtained from a first differential amplifier 36A as a difference between the first and second sums. A third sum of outputs from the second and fourth regions 34B and 34D is produced by a third adder 35C and a fourth sum of outputs from the first and third regions 34A and 34C is formed by a fourth adder 35D. Then, the tracking error signal can be obtained from a second differential amplifier 36B as a difference therebetween.

According to the invention, since the relay lens 28 is arranged between the detection prism 27 and the light detector 29, the distance from the detection prism 27 to the detector 29 no longer affects the focus detection range. Therefore, there may be arranged an optical element between the relay lens 28 and the detector 29.

Figure 9:
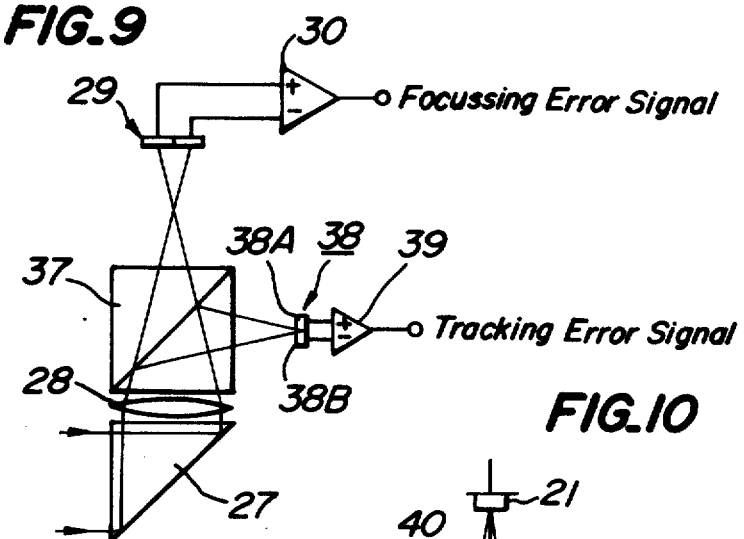

FIG. 9 is a schematic view showing another embodiment of the focussing error signal detecting apparatus according to the invention. In this embodiment, a half mirror 37 is inserted between the relay lens 28 and the detector 29. A light flux transmitted through the half mirror 37 is made incident upon the detector 29 and thus, the differential amplifier 30 produces the focussing error signal. At a focal position of light flux reflected by the half mirror 37 is arranged a light detector 38 comprising two light receiving regions 38A and 38B. Then the tracking error signal can be obtained from a differential amplifier 39 as a difference between outputs from the two light receiving regions 38A and 38B.

Figure 10:
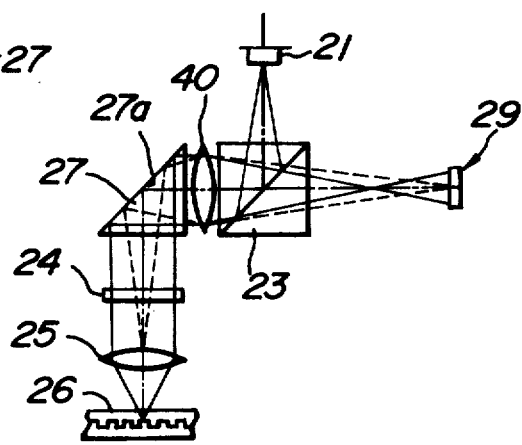

FIG. 10 is a schematic view illustrating still another embodiment of the focussing error signal detecting apparatus according to the invention. In this embodiment the collimator lens 22 and the relay lens 28 shown in FIG. 4 are formed by a common lens 40. That is to say, a laser beam emitted from a laser light source 21 is reflected by a polarization prism 23 and then is converted into a parallel beams by means of the lens 40. The parallel beam is made incident upon a disc 26 by means of reflection surface 27a of the detection prism 27, a quarter-wavelength plate 24 and an objective lens 25. The object reflected by the disc 26 is collected by the objective lens 25 and is made incident upon the detection prism 27 by means of the quarter-wavelength plate 24. The light reflected by the surface 27a is made incident upon the lens 40 and is then transmitted through the polarization prism 23. The transmitted light is made incident upon a light detector 29. Like as the embodiment shown in FIG. 7, the lens 40 forms an image of pupil of the objective lens 25 on the detector 29. Therefore, the light detector 29 may be replaced by the light detector 34 having the four light receiving regions illustrated in FIG. 8.

In the above embodiments, the detection prism is made of material having a refraction index of $\sqrt{2}$ and thus, the reflection surface reflects the incident light in a direction at right angles with respect to the incident light. When use is made of material having a higher refractive index, said angles may be smaller than the right angles.

The present invention is not limited to the embodiments explained above, but may be modified in various manners within the scope of the invention. For instance, in the embodiment shown in FIG. 4, the S polarized light is made incident upon the reflection surface 27a of the detection prism 27, but a P polarized light may be made incident upon the detection prism 27 by inserting a 90° rotator between the polarization prism 23 and the detection prism 23. In such a modification, since the intensity of light reflected by the surface 27a varies very abruptly about the critical angle, the detection sensitivity may be further increased. This may be further attained without arranging the 90° rotator in the embodiment shown in FIG. 10 in which the P polarized light transmitted through the polarization prism 23 is made incident upon the detection prism 27. The detection sensitivity may be further increased by providing an elongated detection prism having a parallel reflection surfaces and the light is reflected between these sufaces by several times. In such a case the sensitivity may be increased by a power of the reflection times. In the embodiments shown in the drawings, the detection prism has the refractive index of $\sqrt{2}$ for the sake of simplicity, but it may have any desired refractive index as long as the reflection surface is set at or near the critical angle. Further, in the above embodiments, use is made of the polarized light, but according to the invention, non-polarized light may be equally used. In the embodiment shown in FIG. 4, it is sufficient for the reflection surface 27a of the detection prism 27 to be arranged with respect to a single light ray among the light flux impinging upon the surface 11 at an angle equal to the critical angle or slightly smaller than the critical angle. Therefore, either diverging or converting light beam may be used, instead of the parallel light beam. Furthermore, the polarizing prism 23 may be replaced by a half mirror. Moreover in the above embodiments the optical member is consisting of the detection prism having a suitable refractive index, but it may be constituted by any other element such as a plane glass plate. It should be further noted that the present invention is not limited to the application to the above mentioned optically reading apparatus for the video disc, but may be applied to the focus detection in various optical instruments.

What is claimed is:

1. A method for detecting a focussing error signal of an objective lens with respect to an object onto which a light spot is to be formed by means of said objective lens, comprising:

focussing light emitted from a light source onto the object;

introducing at least a part of a light flux reflected from the object into an optical member including an optical surface which reflects and/or refracts said part of light flux, said optical member being made of material which has a higher refractive index than that of material into which said light flux enters after being refracted by and transmitted through said optical surface;

guiding at least a part of the light flux reflected and/or refracted by said optical surface to a relay lens and then introducing the light flux transmitted through the relay lens onto a light detector;

detecting by the light detector a variation in distribution of light amount of at least a part of light flux reflected and/or refracted by said optical surface to produce the focussing error signal; whereby the relay lens is arranged between the objective lens and the light detector, in a manner preventing the light incident on the light detector from inverting, even if the objective lens substantively deviates from its focused condition.

2. A method according to claim 1, wherein said optical surface is so set that a given light ray in said part of light flux is made incident upon the optical surface at an angle which is substantially equal to a critical angles when said objective lens is in an in-focussed condition.

3. A method according to claim 1, wherein said optical surface is so set that a given light ray in said part of light flux is made incident upon the optical surface at an angle which is smaller than a critical angle when said objective lens is in an in-focussed condition.

4. A method according to claim 3, wherein a light flux reflected by the optical surface and situated on one side of a boundary plane which includes said light ray and is perpendicular to a plane of incidence, and a light flux reflected by the optical surface and situated on the other side of said boundary plane are separately detected.

5. A method according to claim 1, wherein said optical surface is so set that a given light ray in said part of light flux is made incident upon the optical surface at an angle which is greater than a critical angle when said objective lens is in an in-focussed condition.

6. A method according to any one of claims 2, 3 or 5, wherein said given light ray is a center light ray of the light flux.

7. A method according to claim 1, wherein the light flux reflected by the object impinges upon the optical surface as a parallel light flux in the in-focussed condition.

8. A method according to claim 1, wherein the light flux impinging upon the optical surface is a P-polarized light flux.

9. A method according to claim 1, wherein said relay lens forms an image of a plane situating between the optical surface and the objective lens on the light detector.

10. A method according to claim 9, wherein said relay lens forms an image of a pupil of the objective lens on the light detector.

11. An apparatus for detecting a focussing error signal of an objective lens with respect to an object onto which a light beam emitted from a light source is to be focussed as a light spot by means of said objective lens comprising
- a beam splitting element arranged between the light source and the objective lens for directing the light beam emitted from the light source to the objective lens and directing a light flux reflected by the object into a direction different from that to the light source;
- an optical member arranged to receive at least a part of the light flux reflected from said object and including an optical surface which reflects and/or refracts said part of light flux, said optical member being made of material which has a higher refractive index than that of material into which the light flux enters after being refracted by and transmitted through said optical surface;
- a relay lens arranged to receive at least a part of the light flux reflected and/or refracted by said optical surface;
- light detecting means having at least two light receiving regions arranged to receive the light flux transmitted through said relay lens to produce output signals representing amounts of light impinging upon the light receiving regions; and
- a circuit for receiving the output signals from the light detecting means to form a difference signal as the focussing error signal.

12. An apparatus according to claim 11, wherein said optical member comprises a detection prism.

13. An apparatus according to claim 11, wherein said light receiving regions are so arranged to receive separately a light flux reflected by the optical surface and situated on one side of a boundary plane which includes an optical axis of the optical member and is perpendicular to a plane of incidence, and a light flux reflected by the optical surface and situated on the other side of said boundary plane, respectively.

14. An apparatus according to claim 11, wherein said beam splitting element is constituted by a polarizing prism and a polarized light flux impinges upon the optical surface.

15. An apparatus according to claim 14, further comprising a quarter-wavelength plate arranged between the polarizing prism and the objective lens.

16. An apparatus according to claim 15, wherein the optical member is arranged between the polarizing prism and the light detecting means to receive at least a part of the light flux reflected by the polarizing prism, and the light emitted from the light source is transmitted through the polarizing prism.

17. An apparatus according to claim 15, wherein the optical member is arranged between the polarizing prism and the objective lens, the light emitted from the light source is reflected by the polarizing prism and then is totally reflected by the optical surface, and the light flux reflected by the object is reflected by the optical surface and then is transmitted through the polarizing prism.

18. An apparatus according to claim 17, wherein said relay lens is arranged between the polarizing prism and the optical member and the light detector is arranged to receive the light flux transmitted through the polarizing prism.

19. An apparatus according to claim 14, wherein the polarized light flux is a P-polarized light flux.

20. An apparatus according to claim 11, further comprising a collimator lens arranged between the light source and the objective lens to introduce a parallel light flux to the optical surface.

21. An apparatus according to claim 11, wherein the optical member is so arranged that the optical surface makes with respect to a given light ray in incident light flux an angle which is substantially equal to a critical angle.

22. An apparatus according to claim 11, wherein the optical member is so arranged that the optical surface makes with respect to a given light ray in incident light flux an angle which is smaller than a critical angle.

23. An apparatus according to claim 11, wherein the optical member is so arranged that the optical surface makes with respect to a given light ray in incident light flux an angle which is greater than a critical angle.

24. An apparatus according to claim 11, wherein said light flux impinging upon the optical surface is a parallel light flux in an in-focussed condition of the objective lens.

25. An apparatus according to claim 11, wherein said relay lens forms an image of a plane situating on an optical axis between the objective lens and the optical member, on the light detector.

26. An apparatus according to claim 25, wherein the relay lens forms an image of a pupil of the objective lens on the light detector.

27. A detection apparatus for detecting a focussing condition of a light focussing means relative to an object onto which a light beam emitted from a light source is projected and reflected thereby comprising:
- means for focussing a light beam into an object;
- reflecting means for diverting at least some of the light passing therethrough after being reflected by an object and passing back through said focussing means, said reflecting means being positioned intermediate a light source and said focussing means, said reflecting means comprising surface means positioned at the critical angle of reflection for a light ray travelling along the optical axis of the objective lens;
- indicating means positioned so as to receive light reflected by said surface means, said indicating means comprising first and second sections;
- lens means for refracting light positioned intermediate said surface means and said indicating means;
- whereby, due to the position of said lens means and said first and second sections, when an object is further from said focussing means than the proper focussing distance the disparity in illumination of said first and second sections will cause said sections to detect a first state and when an object is closer to said focussing means than the proper focussing distance the contrasting disparity in illumination of said first and second sections will cause said sections to detect a second state.

28. The detection apparatus of claim 27, wherein said focussing means comprises an optical element and when an object is closer than the proper focussing distance to said optical element diverging light rays illuminate said surface means such that said first section is illuminated to a greater extent than said second section and when an object is positioned further from said optical element than the proper focussing distance converging light rays are transmittd from said optical element whereby one of two conditions will result, the first condition occurring if the surface means is located at a distance such that the light rays do not converge to a focussing point prior to illuminating said surface means then converging rays will strike said surface means and will subsequently be converged to a focussing point by said lens means and become diverging rays prior to illuminating said second section, the second condition being if said surface means is located at a distance such that the light rays converge to a focussing point and become diverting rays prior to illuminating said surface means, the rays will not be converged to a focussing point by said lens means prior to illuminating said second section, whereby should either one of said two conditions occur, said second section will be illuminated to a greater extent than said first section.

29. The detection apparatus of claim 28, wherein said reflecting means comprises means for beam splitting, said beam splitting means comprising first prism means for diverting the light rays, said reflecting means further comprising means forming second prism means, said surface means being located on said second prism means.

30. The detection apparatus of claim 29, further including differential amplifier means and circuit means for carrying electrical signals from said indicating means to said differential amplifier means.

31. The detection apparatus of claim 29, wherein said first prism means is a polarizing prism.

32. The detection apparatus of claim 31, further including half mirror means for diverting a portion of a light beam and detecting means for revealing positioning error, said half mirror means being positioned intermediate said indicating means and said lens means and causing the diverted portion of the light beam to illuminate said detecting means, whereby the improper positioning of the beam in the plane of the object is indicated by said detecting means.

33. The detection apparatus of claim 32, wherein said detecting means comprises two light receiving regions.

34. The detection apparatus of claim 31, wherein the distance between said lens means and said indicating means is such that said lens means forms the image of the pupil of said optical element on said indicating means.

35. The detection apparatus of claim 28, wherein said optical element, said reflecting means, said lens means, and said indicating means are arranged such that the lens means produces the image of the object plane between the indicating means and lens means and the image of a pupil of said optical element on said indicating means.

36. The detection apparatus of claim 35, wherein said first and second sections each contain two segments and said four segments are arranged about the optical axis of said lens means such that each of said segments forms a quadrant relative thereto, whereby variation of illumination can be detected in four planar directions from the optical axis of said lens means.

* * * * *